United States Patent Office 3,755,589
Patented Aug. 28, 1973

3,755,589
COMPOSITIONS AND METHODS FOR TREATING GOUT
David B. Reisner, Hightstown, Bernard J. Ludwig, North Brunswick, and Frank M. Berger, Princeton, N.J., assignors to Carter-Wallace, Inc., New York, N.Y.
No Drawing. Continuation-in-part of applications Ser. No. 826,738, Mar. 24, 1969, now abandoned, and Ser. No. 4,745, Jan. 21, 1970, now Patent No. 3,598,814. This application Aug. 5, 1971, Ser. No. 169,556
Int. Cl. A61k 27/00
U.S. Cl. 424—272
4 Claims

ABSTRACT OF THE DISCLOSURE

Chemical compounds of the formula:

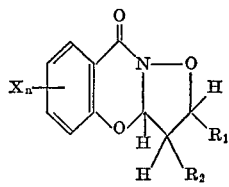

wherein $n$ is 1 or 2 and wherein each X is hydrogen, hydroxy, halogen, lower alkyl, lower alkoxy, nitro, amino, acetamido, sulfonamido or trifluoromethyl and each R is selected from the group consisting of hydrogen and lower alkyl. Said compounds have demonstrated hypouricemic activity in humans as well as valuable antiinflammatory, antipyretic and diuretic activities in standard laboratory animals.

---

This application is a continuation-in-part of U.S. application Ser. No. 826,738, filed Mar. 24, 1969, now abandoned and U.S. application Ser. No. 4,745, filed Jan. 21, 1970, now U.S. Pat. 3,598,814.

The present invention relates to novel chemical compounds. More particularly, the invention relates to novel compounds which possess useful pharmacological properties.

The compounds of the present invention, which can be classified as 3,3a-dihydro-2H-,9H-isoxazolo(3,2-b) (1,3)benzoxazin-9-ones, can be represented by the following general formula:

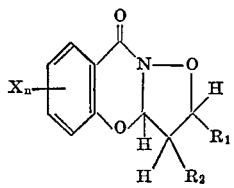

wherein $n$ is 1 or 2 and each X is hydrogen, hydroxy, halogen, lower alkyl, lower alkoxy, nitro, amino, acetamido, sulfonamido or trifluoromethyl and each R is selected from the group consisting of hydrogen and lower alkyl. When X is amino the compounds can be used in the form of the non-toxic pharmaceutically acceptable acid addition salts, such as the hydrochloride, citrate, maletate, and the like. As used herein and in the appended claims, the terms "lower alkyl" and "lower alkoxy" signify alkyl and alkoxy radicals having from 1 to 6 carbon atoms.

The compounds of the invention can be conveniently prepared according to the following synthetic route:

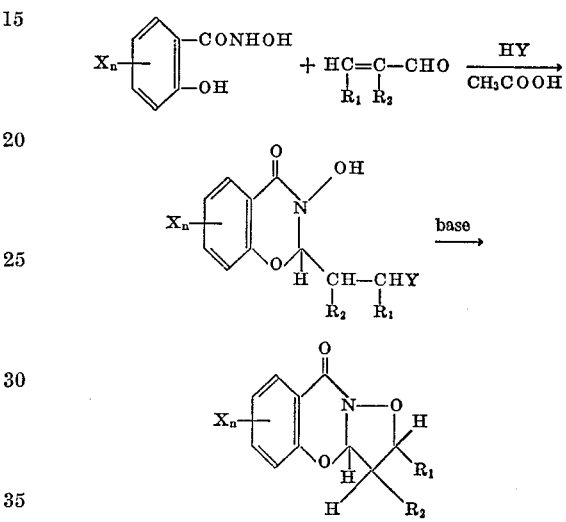

In the first reaction step, a salicylhydroxamic acid, substituted or unsubstituted, is reacted with a substituted or unsubstituted acrolein, in a medium such as acetic acid or ethanol in the presence of hydrogen halide to yield the desired intermediate. The reaction is carried out at a temperature of from about 20° to about 70° C. The intermediates, which can be classified as 2-(2-haloalkyl) - 2,3 - dihydro-3-hydroxy-4H-1,3-benzoxazin-4-ones, are also novel compounds.

Cyclization of the intermediate compound under basic conditions yields the desired product. Said cyclization can be carried out using organic or inorganic bases in the appropriate solvent.

Table I, which follows, sets forth the physical constants of a number of novel intermediates of the present invention. Table II sets forth the physical characteristic of a representative number of the novel compounds.

TABLE I

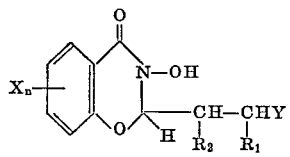

| | | | | | | Carbon | | Hydrogen | | Nitrogen | | Y | |
|---|---|---|---|---|---|---|---|---|---|---|---|---|---|
| X | Y | R₁ | R₂ | M.P.,° C. | Formula | Calcd. | Fd. | Calcd. | Fd. | Calcd. | Fd. | Calcd. | Fd. |
| H | Cl | H | H | 112.5–113.5 | C₁₀H₁₀ClNO₃ | 52.79 | 52.84 | 4.43 | 4.31 | 6.15 | 6.15 | 15.57 | 15.33 |
| H | Cl | CH₃ | H | 115–117 | C₁₁H₁₂ClNO₃ | 54.80 | 54.81 | 4.98 | 4.98 | 5.81 | 5.73 | 14.68 | 14.78 |
| 6-Cl | Cl | H | H | 114–115 | C₁₀H₉Cl₂NO₃ | 45.80 | 45.95 | 3.46 | 3.50 | 5.32 | 5.40 | 27.05 | 27.38 |
| 6-CH₃ | Cl | H | H | 118–120 | C₁₁H₁₂ClNO₃ | 54.80 | 54.63 | 4.98 | 5.02 | 5.81 | 5.81 | 14.68 | 14.63 |
| H | Cl | H | CH₃ | 149–150 | C₁₁H₁₂ClNO₃ | 54.80 | 54.71 | 4.98 | 4.99 | 5.81 | 5.75 | 14.68 | 14.93 |
| 6-NO₂ | Cl | H | H | 147–149 | C₁₀H₉ClN₂O₅ | 44.05 | 44.04 | 3.33 | 3.50 | 10.27 | 10.05 | | |
| 6-CH₃O | Cl | H | H | 154–155 | C₁₁H₁₂ClNO₄ | 51.19 | 51.01 | 4.67 | 4.60 | 5.48 | 5.41 | 13.81 | 14.00 |
| 7-CF₃ | Cl | H | H | 134–135 | C₁₁H₉ClNO₃¹ | 44.70 | 44.64 | 3.05 | 2.88 | 4.74 | 4.58 | 12.00 | 11.87 |

¹ Fluorine: Calcd. 19.30, Fd. 19.53.

TABLE II

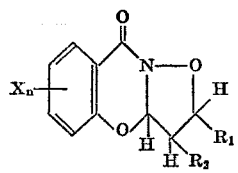

| Compound No. | X | R₁ | R₂ | Method | M.P. °C | Formula | Carbon Calcd. | Carbon Fd. | Hydrogen Calcd. | Hydrogen Fd. | Nitrogen Calcd. | Nitrogen Fd. | Other elements Calcd. | Other elements Fd. |
|---|---|---|---|---|---|---|---|---|---|---|---|---|---|---|
| 1 | H | H | H | B | 89.5–90.5 | C₁₀H₉NO₃ | 62.82 | 62.80 | 4.74 | 4.70 | 7.33 | 7.28 | | |
| 2 | 7-Cl | H | H | A, B | 148–149 | C₁₀H₈ClNO₃ | 53.22 | 53.52 | 3.57 | 3.54 | 6.21 | 6.30 | ¹15.72 | 15.79 |
| 3 | 7-CH₃ | H | H | B | 132–133 | C₁₁H₁₁NO₃ | 64.38 | 64.84 | 5.40 | 5.68 | 6.83 | 6.79 | | |
| 4 | H | CH₃ | H | C | 118–120.5 | C₁₁H₁₁NO₃ | 64.38 | 64.33 | 5.40 | 5.49 | 6.83 | 6.76 | | |
| 5 | H | H | CH₃ | A | 105–108 | C₁₁H₁₁NO₃ | 64.83 | 64.30 | 5.30 | 5.43 | 6.83 | 6.66 | | |
| 6 | 7-NO₂ | H | H | C | 192–193 | C₁₀H₈N₂O₅ | 50.85 | 50.68 | 3.41 | 3.33 | 11.86 | 11.66 | | |
| 7 | 7-CH₃O | H | H | A | 164–165 | C₁₁H₁₁NO₄ | 59.73 | 59.67 | 5.01 | 5.22 | 6.33 | 6.28 | | |
| 8 | 6-CF₃ | H | H | A | 158–159 | C₁₁H₈F₃NO₃ | 51.00 | 51.23 | 3.09 | 3.17 | 5.41 | 5.35 | ²22.00 | 21.90 |
| 9 | 7-Cl | CH₃ | H | A | 147–149 | C₁₁H₁₀ClNO₃ | 55.20 | 55.24 | 4.22 | 4.17 | 5.86 | 5.75 | ¹14.73 | 14.69 |
| 10 | 7-NH₂ | H | H | | 211–212 | C₁₀H₁₀N₂O₃ | 58.25 | 58.11 | 4.89 | 4.81 | 13.59 | 13.47 | | |
| 11 | 5,7-diCl | H | H | D | 151–153 | C₁₀H₇Cl₂NO₃ | 46.29 | 46.22 | 2.70 | 2.72 | 5.38 | 5.45 | ¹27.20 | 27.24 |
| 12 | 5,7-diCl | CH₃ | H | A | 172–174 | C₁₁H₉Cl₂NO₃ | 48.21 | 48.05 | 3.31 | 3.34 | 5.11 | 5.00 | ¹25.88 | 25.77 |

¹ Chlorine.  ² Fluorine.

The following Examples 1 and 2 illustrate the preparation of the 7-chloro-3,3a-dihydro-2H,9H-isoxazolo(3,2-b)(1,3)benzoxazin-9-one (Compound 2, Table II).

EXAMPLE 1

Preparation of 6-chloro-2-(2-chloroethyl)-2,3-dihydro-3-hydroxy-4H-1,3-benzoxazin-4-one (Table I)

Hydrogen chloride gas (36.5 g.) was added to 300 ml. of glacial acetic acid at about 10° C. To one-half of this solution was added 88 g. of 5-chlorosalicylhydroxamic acid, and then 28 g. of acrolein and the remaining half of the hydrogen chloride-acetic acid mixture were introduced simultaneously with stirring and cooling at a rate to maintain a temperature of 25 to 50° C. The resulting mixture was stirred and heated at 50° C. for one and one-half hours and then allowed to stand at room temperature for 2 hours. Ice was then added and solid was removed, washed well with water and air-dried. It weighed 100 g. and melted at 80–90° C. After several recrystallizations from ligroin, the melting point was raised to 114–115° C.

EXAMPLE 2

Preparation of 7-chloro-3,3a-dihydro-2H,9H-isoxazole(3,2-b)(1,3)benzoxazin-9-one (Compound 2, Table II)

Method A.—96 g. of crude 6-chloro-2-(2-chloroethyl)-2,3-dihydro-3-hydroxy-4H-1,3-benzoxazin-4-one was dissolved in 150 ml. of 10% aqueous solution of sodium hydroxide. After several minutes, a solid precipitated. Mixture was diluted with water, filtered and solid was washed with water and air-dried. The product weighed 67 g. and melted at 148–149° C. On recrystallized from ethyl acetate, 7-chloro - 3,3a - dihydro-2H,9H-isoxazolo(3,2-b)(1,3)benzoxazin-9-one melting at 148–149° C. was obtained.

Method B.—A solution of 64 g. of crude 6-chloro-2-(2-chloroethyl)-2,3-dihydro - 3 - hydroxy - 4H - 1,3 - benzoxazin-4-one and 13.5 of sodium methoxide in 450 ml. of ethanol was heated at reflux for one-half hour, cooled and filtered. The filtrate was evaporated to dryness and residue was recrystallized several times from ethyl acetate giving a product which then melted at 148–149° C.

The following Example 3 illustrates the preparation of 2-methyl-3,3a-dihydro - 2H,9H - isoxazolo(3,2-b)(1,3)-benzoxazin-9-one (Compound 4, Table II) by the alkaline cyclization of 2-(2-chloropropyl)-2,3-dihydro-3-hydroxy-4H-1,3-benzoxazin-4-one. The latter intermediate was prepared by the reaction of salicylhydroxamic acid, crotonaldehyde and hydrogen chloride following the procedure detailed in Example 1.

EXAMPLE 3

Preparation of 2-methyl - 3,3a - dihydro-2H,9H-isoxazolo(3,2-b)(1,3)benzoxazin-9-one (Compound 4, Table II)

Method C.—A mixture of 14 g. of crude 2-(2-chloropropyl)-2,3-dihydro-3-hydroxy - 4H - 1,3 - benzoxazin-4-one and 50 ml. of 5% aqueous solution of sodium carbonate was shaken and warmed. It was then cooled and the solid was removed by filtration, washed with water, and air-dried. The crude product weighed 11 g. and melted at 112–116.5° C. After recrystallization from ethyl acetate, the purified 2-methyl-3,3a-dihydro-2H,9H-isoxazolo(3,2-b)(1,3)-benzoxazin-9-one melted at 118–120.5° C.

EXAMPLE 4

Preparation of 2-methyl - 3,3a - dihydro-2H,9H-isoxazolo(3,2-b)(1,3)benzoxazin - 9 - one (Compound 11, Table II)

Method D.—21.4 g. of crude 6,8-dichloro-2-(2-chloroethyl)-2,3-dihydro-3-hydroxy-4H-1,3-benzoxazin - 4 - one was converted to 17.6 g. of 5,7-dichloro-3,3a-dihydro-2H,9H-isoxazolo(3,2 - b)(1,3)benzoxazin-9-one (M.P. 149–150° C.) with 375 ml. of a dilute aqueous solution of ammonium hydroxide. The melting point was raised to 151–153° C. after recrystallization from ethyl acetate.

The following Example 5 illustrates the preparation of the 7-amino-3,3a-dihydro-2H,9H-isoxazolo(3,2 - b)(1,3)benzoxazin-9-one (Compound 10, Table II).

EXAMPLE 5

Preparation of 7-amino-3,3a-dihydro-2H,9H-isoxazolo(3,2-b)(1,3)benzoxazin-9-one (Compound 10, Table II)

13.8 g. of Compound No. 6 (Table II) in 200 ml. of ethanol containing 1 g. of platinum oxide was hydrogenated at room temperature and 40 lbs. pressure. The mixture was filtered and residue was extracted several times with hot acetone. The acetone solutions were combined and evaporated to dryness. The residue was recrystallized from a mixture of methanol and dimethylformamide, giving purified 7-amino-3,3a-dihydro-2H,9H-isoxazolo(3,2-b)(1,3)benzoxazin-9-one, M.P. 211–212° C. (dec.).

Clinical evaluation of one of the drugs of the present invention, [7-chloro - 3,3a - dihydro-2H,9H-isoxazolo(3,2-b)(1,3)benzoxazin-9-one], demonstrated hypouricemic activity at daily doses of 1.0 to 1.8 g. in six of seven patients with acute gouty arthritis. The average pre-treatment serum uric acid level was 8.26±.42 mg./100 ml. compared to 5.36±.29 mg./100 ml. post-treatment.

In a controlled dose-response study this drug was administered at three different total daily dose levels (200, 500 and 1,000 mg.) to 11 patients with chronic primary metabolic gout. The compound clearly demonstrated both dose-related hypouricemic and uricosuric activities. The results of the study are presented in the following table.

TABLE III

| Dose, mg. b.i.d. | Total No. patients | Number responding | Serum uric acid levels (mg./100 ml.) | |
|---|---|---|---|---|
| | | | Pre-treatment | Post-treatment |
| 200 | 3 | 0 | 8.00 | 8.15 |
| 150 | 5 | 3 | 8.15 | [1] 7.20 |
| | | | 8.30 | [2] 6.77 |
| 500 | 3 | 3 | 9.00 | 6.90 |

[1] Responders and non-responders.
[2] Responders only.

The compounds of the present invention are also useful as a result of other valuable pharmacological properties, for example, they are valuable anti-inflammatory agents, as evidenced by their ability to inhibit the local adema formation characteristic of inflammatory states when administered systemically to warm-blooded animals.

The procedure described below (Winters et al., Proc. Soc. Exp. Biol. Med., 111, 544, 1962) was used to establish the effectiveness of these compounds in the hind paw edema induced by carrageenin in the rat. This procedure is considered suitable for demonstrating anti-inflammatory activity of drug compounds in laboratory animals.

Male rats of the Sprague-Dawley strain (Charles River Laboratories) weighing 100±20 grams were used for this study. Six animals were used for each drug dose. The drugs were suspended in 1% aqueous solution of gum acacia, and each rat received 10 ml./kg. of the appropriate concentration of drug suspension by oral intubation; controls were given a similar volume of the vehicle. One hour later, edema in the right hind paw was induced by the subplantar injection of 0.05 ml. of 1% calcium carrageenin dissolved in 0.15 N sodium chloride. The volume of the foot was determined immediately and again 3 hours later. The difference was recorded as edema volume. Foot volume was measured by immersion of the foot in water at the level of the lateral malleolus, and determining the volume of water displaced by the foot. The $ED_{50}$ may be defined as the dose in which edema formation is inhibited by 25% or more in 50% of the rats when compared to the mean value of the controls.

The compounds found effective using this procedure are identified below:

Compound No. (Table II):       $ED_{50}$±S.E. (mg./kg., p.o.)

| | |
|---|---|
| 1 | 65±26 |
| 2 | 53±13 |
| 3 | 140±47 |
| 4 | 50±17 |
| 5 | 140±47 |
| 9 | 40±14 |
| 11 | 70±25 |

The anti-inflammatory activity of representative compounds of the invention were further demonstrated in the adjuvant-induced polyarthritis assay.

Male rats of the Sprague-Dawley strain (Charles River Laboratories) weighing approximately 200 grams were used. Ten animals were assigned randomly to each experimental drug or control group. The rats were weighed once a week and the drug doses were adjusted accordingly.

Polyarthritis was induced by the subplantar injection of a 0.5% suspension of heat-killed *Mycobacterium tuberculosis* in mineral oil to the right hind paw (Newbould, B. B., Brit. J. Pharmacol. 21, 127, 1963). The volume of the right (injected) and left (uninjected) hind paws was determined immediately before the induction of the arthritis and again 18 days later (approximately 18 hours after the last drug dose was administered); the difference was recorded as "edema volume." Paw volume was determined by measuring the volume (mm.³) of water displaced by each paw when it was immersed in a water-filled graduated cylinder up to the level of the lateral malleolus.

In one experiment, the weights of the inoculated right hind paw and the uninoculated left hind paw were determined by severing the paws at the tibio-tarsal joint with a Harvard guillotine, and weighing each paw on a Mettler top-loading scale. "Edema weight" was calculated by subtracting the paw weights of non-arthritic control rats from those of arthritic control and treated rats.

Test compounds were suspended in 1% gum acacia and were administered orally in a volume of 10 ml./kg. Fresh suspensions were prepared daily. Controls received 1% gum acacia only. Drug treatment was started on the day that the polyarthritis was induced. The drug was given twice daily, 5 days a week (Monday through Friday) for two weeks and for 4 days (Monday through Thursday) during the third week (total of 28 doses).

The result of a typical experiment is set forth in Table IV, which follows:

TABLE IV

| Drug | Oral dose (mg./kg., b.i.d.) | Assay procedure [1] | Percent inhibition of paw edema | |
|---|---|---|---|---|
| | | | Right paw | Left paw |
| Compound 2, Table II | 150 | V | 64 (a) | 88 (a) |
| | 150 | W | 96 (a) | 100 (a) |
| | 75 | V | 52 (a) | 70 (b) |
| | 75 | W | 78 (a) | 100 (a) |

[1] V = Paw volume measured; W = Paw weight measured.

NOTE.—(a) = Controls vs. treated, $P<0.001$; (b) = Controls vs. treated, $P<0.01$.

The antipyretic activity of the compounds were also determined, using male adult Charles River rats.

Fever was induced by subcutaneous injection of 1 ml./100 g. of a 15% Brewer's yeast suspension in 2% acacia according to the method of Smith and Hambourger (J. Pharmacol. Exp. Ther., 54, 346–351, 1935).

The antipyretic activity of the compounds were observed at 2, 4, 6 and 8 hours after oral administration of the drug.

The result of a typical experiment is set forth in Table V, which follows.

TABLE V.—MEAN TEMPERATURES

| Group | Temperature, °F., at— | | | | |
|---|---|---|---|---|---|
| | 0 hours [1] | 2 hours | 4 hours | 6 hours | 8 hours |
| Control (fevered) | 102.3 | 102.1 | 101.7 | 101.4 | 101.3 |
| Compound 2, Table II: | | | | | |
| 300 mg./kg., p.o. | 102.2 | 99.3 | 98.2 | 98.4 | 98.8 |
| 150 mg./kg., p.o. | 102.2 | 100.5 | 99.9 | 100.5 | 100.6 |
| 75 mg./kg., p.o. | 102.3 | 100.8 | 100.7 | 101.2 | 101.5 |
| Control (non-fevered) | 94.8 | 98.7 | 98.7 | 98.7 | 99.1 |

[1] Base temperature.

The diuretic activity of Compound 2, Table II, was also determined by non-fasted, non-waterloaded rats, using the method essentially described by Cummings et al., J. Pharm. Exp. Ther., 128, 414, 1960.

Male Sprague-Dawley rats (Charles River Laboratories) maintained in a diet of Wayne Lab Blox R were used in this study. The animals, which weighed 200±20 grams, were given food and water ad libitum until the time of drug administration. They were then deprived of food and water for 18 hours; during this time period, urine was collected. The volume and pH of each urine sample was recorded, and an aliquot was used for the determination of sodium, potassium, chloride, and creatinine.

During the urine collection period, groups of 3 rats were placed in each stainless steel metabolism cage, which had been carefully washed and rinsed with distilled water. In addition to mesh floor screens, glass wool was placed in funnels to prevent fecal material from entering the collection flasks. In recovery experiments, fluid loss was less than 5%.

The drug was suspended in 1% gum acacia and administered orally in a volume of 10 ml./kg. Control rats received 10 ml./kg. of 1% gum acacia only.

The data obtained from 4 separate experiments are shown in Table VI.

TABLE VI

| Experiment No. | Drug | No. rat groups | Dosage (mg./kg., p.o.) | Mean urinary pH | Urine output (ml./3 rats/18 hours) | Electrolyte excretion (meq. ×10²/3 rats/18 hours) | | | Creatinine excretion (mg./3rats/18 hours) | Ratio, Na+/K+ |
|---|---|---|---|---|---|---|---|---|---|---|
| | | | | | | Na+ | K+ | Cl- | | |
| 1 | Compound 2 | 5 | 300 | 6.0 | 26.5±1.6 [1] | 217±12 [1] | 407±33 [1] | 193±14 [1] | 11.8±0.4 [1] | 0.53 |
|  |  | 6 | 150 | 6.0 | 21.5±2.6 | 193±32 | 418±26 | 173±28 | 11.8±0.8 | 0.46 |
|  | Controls | 6 |  | 6.5 | 10.2±4.2 | 98±22 | 283±47 | 143±33 | 8.5±2.1 | 0.35 |
| 2 | Compound 2 | 4 | 300 | 6.5 | 41.5±3.5 | 396±33 | 753±23 | 365±36 | 18.0±0.6 | 0.53 |
|  |  | 4 | 100 | 6.5 | 28.0±5.0 | 237±31 | 615±76 | 302±15 | 17.6±1.6 | 0.39 |
|  |  | 4 | 50 | 6.5 | 31.0±3.0 | 223±5 | 538±25 | 271±17 | 18.6±0.6 | 0.41 |
|  | Controls | 8 |  | 6.5 | 20.3±1.5 | 179±16 | 440±33 | 196±20 | 16.5±2.1 | 0.41 |
| 3 | Compound 2 | 4 | 150 | 6.0 | 34.3±5.3 | 243±43 | 579±70 | 235±61 | 21.6±0.8 | 0.41 |
|  |  | 8 | 75 | 6.5 | 22.4±0.8 | 150±24 | 392±38 | 177±26 | 13.8±0.8 | 0.38 |
|  | Controls | 4 |  | 6.0 | 12.8±2.7 | 98±8 | 342±25 | 150±5 | 10.8±0.3 | 0.28 |
| 4 | Compound 2 | 4 | 200 | 6.5 | 22.5±0.5 | 170±19 | 449±45 | 173±4 | 14.0±1.3 | 0.38 |
|  |  | 4 | 100 | 6.0 | 22.5±7.5 | 165±48 | 449±62 | 201±30 | 13.9±2.3 | 0.37 |
|  | Controls | 8 |  | 6.0 | 13.9±1.7 | 91±8 | 233±52 | 128±12 | 11.4±1.5 | 0.28 |

[1] Standard deviation.

The pharmaceutical compositions of the present invention are prepared by incorporating the active ingredient with a suitable pharmaceutical carrier. The carrier must be of such nature that the novel compositions may be administered systemically to warm-blooded animals. The term "systemically," as used herein, means a mode of administration whereby the active ingredient, when given to warm-blooded animals, is effective in the whole body and not merely at the locus of application. This includes parenteral and other methods of administration.

The active ingredients of the present invention are preferably administered orally in the form of tablets or capsules. Suitable solid pharmaceutical carriers which can be utilized include, for example, starch, lactose, sucrose, glucose, gelatin, and the like. When the composition is in the form of a solid, the active ingredient is generally in the amount of from about 25 to about 95% by weight of the total composition.

The active ingredients of the invention can also be dissolved in a liquid pharmaceutical carrier, such as for example, propylene glycol, polyethylene glycol, water, saline, and mixtures thereof, to form a solution suitable for injection. Such injectable solutions generally contain from about 0.05 grams to be about 30 grams of active ingredient per 100 ml. of solution.

What is claimed is:

1. A pharmaceutical composition adapted for human gout treatment comprising from about 25 to about 95% by weight of the total composition of a 3,3a-dihydro-2H, 9H - isoxazolo(3,2-b)(1,3)benzoxazin - 9 - one of the formula:

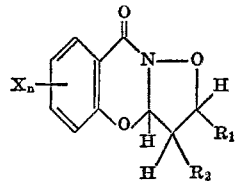

wherein $n$ is 1 or 2 and each X is hydrogen, hydroxy, halogen, lower alkyl, lower alkoxy, nitro, amino, acetamido, sulfonamido or trifluoromethyl and each of $R_1$ and $R_2$ is selected from the group consisting of hydrogen and lower alkyl, and a pharmaceutical carrier.

2. A pharmaceutical composition according to claim 1 comprising 7-chloro - 3,3a - dihydro - 2H,9H - isoxazolo-(3,2-b)(1,3)benzoxazin - 9 - one and a pharmaceutical carrier.

3. The method for the treatment of human gout which comprises administering a pharmaceutical composition to a human for its hypouricemic effect, said composition comprising from about 25 to about 95% by weight of the total composition of a compound of the formula:

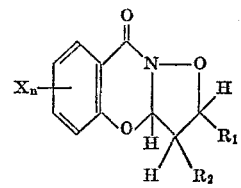

wherein $n$ is 1 or 2 and each X is hydrogen, hydroxy, halogen, lower alkyl, lower alkoxy, nitro, amino, acetamido, sulfonamido or trifluoromethyl and each of $R_1$ and $R_2$ is selected from the group consisting of hydrogen and lower alkyl.

4. The method according to claim 3 wherein said compound is 7-chloro - 3,3a - dihydro-2H,9H-isoxazolo-(3,2-b)(1,3)benzoxazin-9-one.

References Cited
UNITED STATES PATENTS
3,355,453   11/1967   Hasspacher _____ 260—240

STANLEY J. FRIEDMAN, Primary Examiner